United States Patent Office 3,669,683
Patented June 13, 1972

3,669,683
BAKED GOODS
Simon S. Jackel, Westport, Conn., assignor to Wyandotte Chemicals Corporation, Wyandotte, Mich.
No Drawing. Continuation-in-part of application Ser. No. 692,327, Dec. 21, 1967. This application Oct. 2, 1970, Ser. No. 77,741
The portion of the term of the patent subsequent to Oct. 27, 1987, has been disclaimed
Int. Cl. A21d 2/14, 2/16
U.S. Cl. 99—91                       5 Claims

ABSTRACT OF THE DISCLOSURE

A method of improving the dough conditioning of yeast-raised bakery products which comprises mixing with the ingredients of said bakery products a mixture of: (A) a mixture of conjugated polyoxyalkylene compounds corresponding to the formula:

$$HO(C_2H_4O)_a(C_3H_6O)_b(C_2H_4O)_cH$$

wherein $b$ is an integer sufficiently high to provide a molecular weight of at least about 900 for oxypropylene base and wherein $a+c$ is an integer sufficiently high to provide 5 to 90% of the total molecular weight of the compound, and (B) a mixture of mono- and diglycerides.

CROSS REFERENCE TO RELATED APPLICATION

This application is a continuation-in-part of copending U.S. patent application Ser. No. 692,327, filed Dec. 21, 1967, and entitled, "Method for Retarding Staling of Baked Goods" now U.S. Pat. No. 3,536,497.

BACKGROUND OF THE INVENTION

(1) Field of the invention

The present invention pertains to the preparation of yeast-raised bakery products. More particularly, the present invention relates to the dough conditioning of yeast-raised bakery products.

(2) Prior art

In the above-referred to copending patent application, the disclosure of which is hereby incorporated by reference, there is disclosed a method of inhibiting the staling of bread by the addition to the ingredients of a mixture of conjugated polyoxyalkylene compounds corresponding to the formula:

$$HO(C_2H_4O)_a(C_3H_6O)_b(C_2H_4O)_cH$$

wherein $b$ is an integer sufficiently high to provide a molecular weight of at least about 900 for the oxypropylene base and wherein $a+c$ is an integer sufficiently high to provide 5 to 90% of the total molecular weight of the compound. Such compounds being of the type disclosed and claimed in U.S. Pat. No. 2,674,619 and Canadian Pat. No. 540,357.

Although the invention described in the copending application is most advantageous, other problems still exist in the preparation of yeast-raised bakery products. Exemplary of such problems, which have not been fully overcome to date, include dough volume and dough strength, i.e. dough conditioning which if not sufficient renders the dough difficult to process and handle under the conditions of stress encountered in automatic machine handling in wholesale bakery production. Thus, it would be most advantageous to provide a dough conditioner which simultaneously affords a means for retarding the staling of such bakery goods as well as providing suitable dough strength.

SUMMARY OF THE INVENTION

The present invention is based on the discovery that the dough properties of bread and similar yeast-raised bakery products can be significantly improved, in regards to volume and strength, by mixing with the ingredients for the bakery products a mixture of: (A) polyoxyalkylene nonionic surface active agents of the type disclosed in U.S. Pat. No. 2,674,619 and Canadian Pat. No. 540,357, and (B) a mixture of mono- and diglycerides of higher fatty acids.

Because of the presence of the polyoxyalkylene compound, the staling rate of the resulting bakery products is retarded.

For a more comprehensive discussion of the present invention reference is made to the following detailed description and examples thereof.

DESCRIPTION OF THE PREFERRED EMBODIMENT

In accordance with the present invention improved dough for yeast-raised bakery products are prepared by mixing with the ingredients therefor a mixture of: (A) polyoxyalkylene nonionic surface active agents, such as described in U.S. Pat. No. 2,674,619 and Canadian Pat. No. 540,357, the disclosures of which are hereby incorporated by reference, and (B) a mixture of mono- and diglycerides of higher fatty acids.

Particularly desirable among the compounds of the class disclosed in U.S. Pat. No. 2,674,619 and Canadian Pat. No. 540,357 are the water-soluble conjugated polyoxypropylene-polyoxyethylene compounds containing in their structure oxypropylene groups, oxyethylene groups and nucleus of propylene glycol. These compounds are prepared condensing ethylene oxide with a hydrophobic polyoxypropylene glycol base formed by the condensation of propylene oxides with propylene glycol. The average molecular weight of the polyoxypropylene polymer must be at least about 900. The disclosures of these two patents include such compounds where the oxyethylene groups present constitute 5 to 90% of the total molecular weight of the compound.

When ethylene oxide is condensed with a hydrophobic polyoxypropylene glycol base as described above, a mixture of closely related homologues is produced and, accordingly, this product is referred to in the claims as ". . . a mixture of conjugated polyoxyalkylene compounds . . ."

The increasing addition or condensation of ethylene oxide on a given water-insoluble polyoxypropylene glycol base tends to increase its water-solubility and raise the melting point such that the products may be water-soluble, and normally liquid, pasty or solid in physical form. These polyoxyethylene condensates with polyoxypropylene glycol may be designated by the following structure:

$$HO(C_2H_4O)_a(C_3H_6O)_b(C_2H_4O)_cH$$

wherein $b$ is an integer sufficiently high to provide a molecular weight of at least about 900 for the oxypropylene base and wherein $a+c$ is an integer sufficiently high to provide 5 to 90% of the total molecular weight of the compound, and preferably herein from 40 to 90% of the total molecular weight of the compound.

Compounds of this type are sold commercially by the Wyandotte Chemicals Corporation under the trademark Pluronic and are described in the brochure entitled "The Pluronic Grid," fifth edition, published by the Wyandotte Chemicals Corporation, Wyandotte, Mich. The following are examples of compounds corresponding to the above formula as disclosed in the brochure.

TABLE I

| Name | Mol. wt. polyoxypropylene base | Ethylene oxide content in final product, wt. percent | Calculated mole wt. of final product |
|---|---|---|---|
| Pluronic P65 Polyol | 1,750 | 50 | 3,500 |
| Pluronic F68 Polyol | 1,750 | 80 | 8,750 |
| Pluronic P85 Polyol | 2,250 | 50 | 4,500 |
| Pluronic P105 Polyol | 3,250 | 50 | 5,600 |
| Pluronic F108 Polyol | 3,250 | 80 | 16,250 |

The mono- and diglyceride mixture contemplated for use in the present invention generally comprises the glycerides or partial glycerol esters of higher fatty acids. As used herein the term "higher fatty acids" means those naturally occurring and hydrogenated edible higher fatty acids or triglycerides thereof having from about 10 to 24 carbon atoms, such as, for example castor oil, cottonseed oil, corn oil, soybean oil, and the like, as well as the hydrogenated derivatives and triglycerides thereof or mixtures thereof. The glyceride mixture is generally prepared by the transesterification of the higher fatty acid with minor amounts of glycerine under conventional reaction conditions well known in the art. The mono- and di- glyceride mixture contemplated for use herein is well known and a widely available commercial product as evidenced by three presently available commercial products.

The first such product is sold by Atlas Chemical Co. under the name of Atmul 500 which is a mixture of the mono- and diglycerides in a lard base and which contains about 65% by weight of the mixture of the mono- and diglycerides. The mono- and diglycerides are the transesterification products of glycerine and edible fats and oils. A second useful product, also sold by Atlas Chemical Co. is Tandem 8, which is a 50/50 weight mixture of polyoxyethylene sorbitan monostearate and the Atmul 500, i.e. a mixture of mono- and diglycerides in a lard base and containing about 65% by weight of the glyceride mixture. A third commercial product which is efficaciously employed in the practice of the present invention is sold by Anderson Sales Company under the name of Anco EMG 640B. This product is a mixture of ethoxylated monoglycerides in admixture with a mixture of mono- and diglycerides. Generally, the product contains about 40% by weight of oxyethylated monoglycerides, the ethylene oxide comprising about 50% by weight thereof and about 60% by weight of the non-oxyethylated mixture of mono- and diglycerides.

It should be noted that, in regard to these commercial products, it is the fact that they are sources of the mixture of the mono- and diglycerides which is critical hereto. The other ingredients, such as the lard and the polyoxyalkylene sorbitan monostearate are inconsequential to the practice of the present invention. Thus any source of mono- and diglycerides of higher fatty acids fit for human consumption can be and is contemplated herein.

Only a small amount of the mixture of polyoxyalkylene nonionic surfactant and the glyceride mixture is required to improve the properties of the dough of the bakery products. Generally from about 0.3% to 1.0% based on the weight of the flour is sufficient to provide good results. An optimum amount of the mixture ranges from about 0.3% to 0.6% based on the weight of the flour. The mixture generally contains from about 30% to 90% by weight of polyoxyalkylene nonionic surface active agent and from about 70% to 10% by weight of the mixture of glycerides. It is preferred to prepare the present mixture in a weight ratio of the nonionic surface active agent to the mixture of glycerides ranging from about 2:1 to 1:2.

The present mixture may be added to the bakery product mix in any suitable manner. For example, it may be thoroughly mixed with the flour prior to the preparation of the dough, mixed with the shortening used prior to its addition to the mix, added with the salt, added directly to the dough, mixed during the mixing operation, or suspended in the water or milk used in preparing the dough. Except for the incorporation of the mixture, the normal operations employed in breadmaking or making similar baked goods are followed without any variations from those required when this product is not used.

The resulting dough prepared in accordance with this invention by the addition thereto of the present mixture have increased tolerance and resistance thereby providing improved dough conditioning. Moreover, the resulting yeast-raised bakery goods, such as bread, rolls, doughnuts and the like have excellent softness retention, i.e. inhibited rate of staling and quality.

For a more complete understanding of the present invention reference is made to the following examples thereof which are not to be construed as unduly limitative of the present invention.

It is to be further understood that although the present invention is only illustrated by the "Do-Maker" process for bread preparation, the present invention is equally applicable to the "sponge and dough" process as well as to other conventional processes.

EXAMPLE I

This example illustrates the manufacture of a white pan bread by a laboratory version of the well-known "Do-Maker" process. This process is widely known and described in the literature, such as the book, Breadmaking, Its Principles and Practice, fourth edition by Edmund B. Bennion, pp. 214–216, Oxford University Press (1967). This process is begun with the production of a yeast brew or broth from the following components:

| | Weight percent based on weight of flour | Weight in grams |
|---|---|---|
| Water | 69.0 | 3,588.0 |
| Sugar | 8.0 | 416.0 |
| Salt | 2.25 | 117.0 |
| Milk solids | 3.0 | 156.0 |
| Yeast food | 0.5 | 26.0 |
| Calcium acid phosphate | 0.1 | 5.2 |
| Calcium propionate | 0.1 | 5.2 |
| Yeast | 2.5 | 130.0 |

The above ingredients were fermented for 2½ hours at 86° F.

The second step of the process is the "Dough or Premix" stage wherein the following components were mixed to incorporate them uniformly for 45 seconds at low speed (20 r.p.m.) and 15 seconds at medium speed (100 r.p.m.).

| | Weight percent based on weight of flour | Weight in grams | |
|---|---|---|---|
| Flour | 100.0 | 5,200.0 | |
| Broth | 100.0 | 5,200.0 | |
| Lard | 2.64 | 137.28 | These ingredients are melted and blended before use. |
| Cottonseed flakes | 0.14 | 7.28 | |
| Mixture of: | | | |
| (a) Pluronic F-108 Polyol | 0.25 | 13.0 | |
| (b) Anco EMB 640B | 0.25 | 13.0 | |

Note.—Oxidation solution: 12.5 p.p.m. of $KIO_3$; 50.0 p.p.m. of $KBrO_3$.

The above premix dough was then transferred into the loading cylinder of a laboratory continuous developer, wherein the hydraulically operating piston forces the mixture from the loading cylinder into the developer bowl in which two counter-rotating impellers are located which subject the dough to a continuous stretching and folding as it passes under pressure to the extrusion point. The development takes place during passage of the mixture through the developer bowl, and the developed dough was extruded under pressure as a ribbon which was manually divided. The dough was proofed for about 60 minutes in a proofing cabinet maintained at 110° F. with a nearly water-saturated atmosphere, and then baked for 18 minutes at 425° F. The finished loaves had good volume, a very silky texture, and a very white crumb color. A Baker Compressimeter was employed for making compressimeter readings which are the force in grams required to depress a plate 1.25" square a distance of 2 millimeters, into a uniform slice 0.5" square in thickness. The reading obtained after 72 hours was 9.8 thereby evidencing no impairment of the staling retardency by the use of the present mixture.

The regular volume of the bread, which was measured by rapeseed displacement, was 4.95 ml./gm. The dough strength of the bread was measured in accordance with the "Drop Abuse Test" as described by Jackel & Diachuk, Cereal Science Today, vol. 14, No. 9, September 1969, at p. 312. This test generally comprises dropping a pan of proofed dough onto a table and thereafter measuring the specific volume thereof by rapeseed displacement. After subjection to the drop abuse test, the above-prepared bread had a specific volume of 4.08 ml./gm.

EXAMPLE II

Following the procedure of Example I a series of breads were prepared using varying amounts of the mixture of the present invention. These breads and their resultant properties are set forth below in Table II. In evaluating these data a control bread was prepared and tested which had present therein 0.22% of Atmul 500. This control bread is similar to those presently marketed.

ular weight of at least about 900 for oxypropylene base and wherein $a+c$ is an integer sufficiently high to provide 5 to 90% of the total molecular weight of the compound, and (B) a mixture of mono- and diglycerides of higher fatty acids.

2. The method of claim 1 wherein said mixture of (A) and (B) is employed in an amount of from about 0.3 to 1.0% by weight of the total flour in the mix prior to baking.

3. The method of claim 2 wherein $b$ is an integer having a value to provide a molecular weight of about 1,500 to 3,500 for the oxypropylene base and $a+c$ is an integer having a value to provide 40 to 90% of the total molecular weight of the compound.

4. The method of claim 2 wherein said mixture (A) and (B) consists of from about 30% to 90% by weight of the mixture of conjugated polyoxyalkylene compounds and from about 70 to 10% by weight of the mixture of mono- and diglycerides.

5. The method of claim 4 wherein the mixture of polyoxyalkylene compounds is present in the mixture (A) and (B) in a weight ratio ranging from about 2:1 to 1:2 to said mixture of mono- and diglycerides.

TABLE II

| Bread | Pluronic F-108 Polyol | Mono- and diglycerides in lard base | 50/50 mixture of glycerides and polyoxyethylene sorbitan monostearate | 40/60 mixture of ethoxylated monoglycerides and mono- and diglycerides | Volume after drop, ml./gm. | Regular volume, ml./gm. | Compressimeter reading after 72 hours |
|---|---|---|---|---|---|---|---|
| Control | | 0.22 | | | 3.40 | 4.69 | 10.4 |
| 1 | 0.25 | | 0.25 | | 3.96 | 4.76 | 9.6 |
| 2 | 0.25 | | 0.25 | 0.25 | 3.43 | 5.05 | [1] 10.3 |
| 3 | 0.375 | | 0.125 | | 3.90 | 4.90 | 9.5 |
| 4 | 0.375 | 0.565 | | | 4.17 | 4.75 | 9.65 |
| 5 | 0.375 | | | 0.125 | 3.80 | 4.95 | 9.6 |

[1] After 96 hours.

It can be seen from above that in all instances the breads prepared in accordance with the present invention outperformed a standard bread formulation.

What is claimed is:

1. In the preparation of yeast-raised bakery products, the method of improving the dough thereof by incorporating with the ingredients of said bakery products a mixture of (A) a mixture of conjugated polyoxyalkylene compounds corresponding to the formula:

$$HO(C_2H_4O)_a(C_3H_6O)_b(C_2H_4O)_cH$$

wherein $b$ is an integer sufficiently high to provide a molec-

References Cited
UNITED STATES PATENTS 3,536,497 10/1970 Jackel _____ 99—91
3,379,535 4/1968 Lanfried et al. _____ 99—91

LIONEL M. SHAPIRO, Primary Examiner

J. R. HOFFMAN, Assistant Examiner

U.S. Cl. X.R.

99—86, 92